UNITED STATES PATENT OFFICE.

CHARLES GEORGE, OF BERLIN, GERMANY.

METHOD OF MANUFACTURING ARTIFICIAL GRANITE AND MARBLE.

SPECIFICATION forming part of Letters Patent No. 477,326, dated June 21, 1892.

Application filed January 6, 1891. Serial No. 376,915. (No specimens.)

*To all whom it may concern:*

Be it known that I, CHARLES GEORGE, a subject of the King of Prussia, German Emperor, and a resident of Berlin, in the Kingdom of Prussia, German Empire, have invented a certain new and useful Method of Manufacturing Artificial Granite and Marble, of which the following is a full and exact specification.

The method, hereinafter described, for the manufacture of artificial granite and marble is characterized by the mixture of uncolored batches with colored ones, which latter are employed in a tough or semi-fluid state, and the novel and distinct feature of my invention is the separate melting of two or more different batches prior to mixing the same with another. By mixing the colored semi-fluid batches into the uncolored liquid batches the marbling and speckledness and the veins are produced. The batches may be mixed, besides, with certain materials by the use of which the flux is rendered resistive and a polishable stone is attained. For producing artificial granite or marble little pieces of granite or marble are admixed to the batches in such a manner that said pieces remain distributed within the batches in equal quantities.

The process is the following: I take one to five portions of slag—as, for instance, silicate slag or blast-furnace slag—in a finely-ground state and I mix said slag with ten to fifteen portions of argilliferous building-sand, which when molten gives no glassy mass in consequence of its contents of clay. I add to this mixture under certain circumstances one portion of granite or marble in pieces, and the whole is mixed with three per cent. to six per cent. of fluor-spar. When using particular fine granite, I take still three per cent. to six per cent. silicic acid in form of flint. That mixture is molten now in a regenerative firing with large pot and is filled when liquid in crucibles and cast by means of the latter either directly in molding-sand or into iron molds over which rollers are moved.

When manufacturing veined stones, the silicate slag is replaced by an addition of one to three portions of oxide of zinc, while the other ingredients remain the same. In this case mixtures are employed and molten which are distinguished by an oxide color, and by the employment of different oxides different colors may be obtained, as will be required. The colored mass is kept in a somewhat tough state, and is mixed into the other mass by means of a wooden rod, so that a vein-like distribution of the colored mass is produced, by which the artificial stone gets the appearance of marble and the like.

The colors employed may be very different, so that all kinds of marble may be attained.

Having thus fully described the nature of this invention, I declare that what I desire to secure by Letters Patent of the United States is—

The method of manufacturing artificial marble, consisting in mixing finely-ground silicates with argilliferous sand and in special cases with fragments of marble, in melting the mixture in a regenerative firing, in mixing the batch with a similar one prepared separately in the same manner and kept in a tough state and colored by the addition of a metallic oxide, and in casting the resulting batch into molds, for the purpose as described.

In testimony whereof I have signed this specification in the presence of two subscribing witnesses.

CHARLES GEORGE.

Witnesses:
 OTTOMAR WERNAER,
 FRITZ FEUERHERDT.